(12) United States Patent
Hung et al.

(10) Patent No.: US 10,855,182 B2
(45) Date of Patent: Dec. 1, 2020

(54) POWER CONVERSION CIRCUIT AND OPERATING METHOD THEREOF

(71) Applicant: uPI semiconductor corp., Zhubei (TW)

(72) Inventors: Wei-Hsiu Hung, Zhubei (TW); Chih-Lien Chang, Zhubei (TW)

(73) Assignee: UPI SEMICONDUCTOR CORP., Zhubei (TW)

( * ) Notice: Subject to any disclaimer, the term of this patent is extended or adjusted under 35 U.S.C. 154(b) by 0 days.

(21) Appl. No.: 16/716,699

(22) Filed: Dec. 17, 2019

(65) Prior Publication Data

US 2020/0195142 A1 Jun. 18, 2020

(30) Foreign Application Priority Data

Dec. 18, 2018 (CN) .......................... 2018 1 1547676

(51) Int. Cl.
*H02M 3/158* (2006.01)
*H02M 3/157* (2006.01)

(52) U.S. Cl.
CPC ........... *H02M 3/158* (2013.01); *H02M 3/157* (2013.01)

(58) Field of Classification Search
CPC ................. H02M 3/158; H02M 3/157; H02M 2001/0025; H02M 2001/0009; H02M 1/083

See application file for complete search history.

(56) References Cited

U.S. PATENT DOCUMENTS

| | | |
|---|---|---|
| 7,382,114 B2 | 6/2008 | Groom |
| 7,800,352 B2 | 9/2010 | Qiu et al. |
| 7,872,456 B2 | 1/2011 | Li et al. |
| 8,941,368 B2 * | 1/2015 | Yang .................. G05F 1/46 323/285 |
| 9,083,240 B2 * | 7/2015 | Nakamoto .......... H02M 3/1582 |
| 9,276,477 B2 | 3/2016 | Thomas et al. |
| 2014/0084883 A1 * | 3/2014 | Tanabe ................ H02M 3/1582 323/271 |

* cited by examiner

*Primary Examiner* — Adolf D Berhane
*Assistant Examiner* — Afework S Demisse
(74) *Attorney, Agent, or Firm* — McClure, Qualey & Rodack, LLP (57) ABSTRACT

A power conversion circuit includes an error amplifying circuit, a first comparison circuit, a second comparison circuit and a control circuit. The error amplifying circuit provides an output signal. The first comparison circuit, coupled to the error amplifying circuit, receives the output signal and a ramp signal to generate a first comparison signal. The second comparison circuit receives an output voltage and a first reference voltage and provides a second comparison signal. The control circuit, coupled to the error amplifying circuit, the first comparison circuit and the second comparison circuit, provides a control signal to control the error amplifying circuit according to the first comparison signal, the second comparison signal and an enabling signal. In a first operation mode of error amplifying circuit, the output signal is an error amplifying signal. In a second operation mode of error amplifying circuit, the output signal is a second reference voltage.

8 Claims, 8 Drawing Sheets

POWER CONVERSION CIRCUIT AND OPERATING METHOD THEREOF

BACKGROUND OF THE INVENTION

1. Field of the Invention

The invention relates to power conversion; in particular, to a power conversion circuit and a power conversion circuit operating method.

2. Description of the Prior Art

In a conventional constant on-time (COT) power conversion circuit, an error amplifier is used to receive an output voltage and a reference voltage and to provide an output signal for generating a pulse width modulation (PWM) signal to control an output stage to generate an output voltage and an output current.

Figure 1:
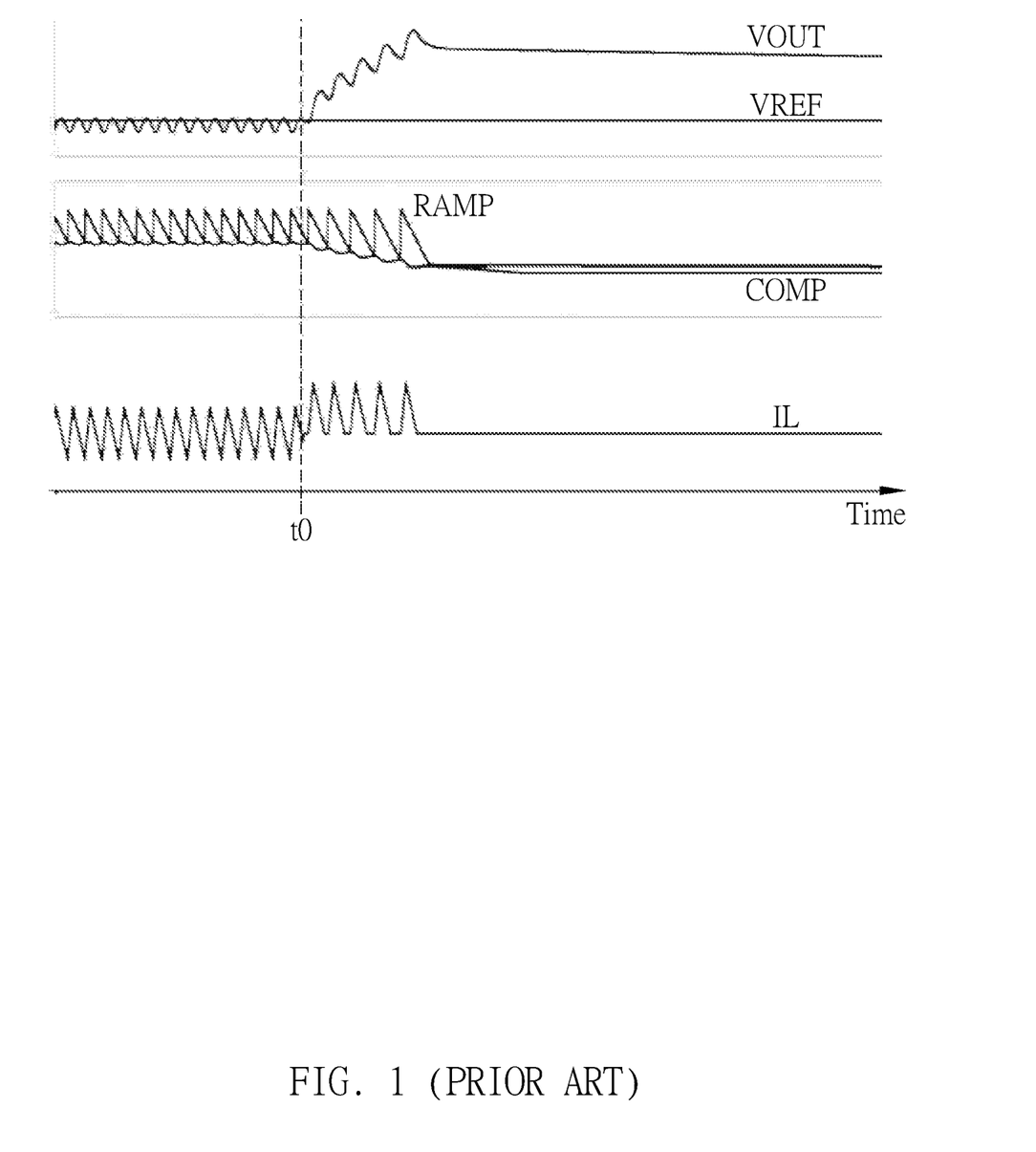
FIG. 1 illustrates timing diagrams of the output voltage, the reference voltage, the output signal, the ramp signal and the inductor current when the conventional power conversion circuit is switched from the CCM to the DCM.

Please refer to FIG. 1. FIG. 1 illustrates the operational waveforms of the signals in the conventional COT power conversion circuit. When the COT power conversion circuit is switched from a continuous conduction mode (CCM) to a discontinuous conduction mode (DCM) at time t0, a zero-current (ZC) mechanism is activated accordingly. Under the condition that an average of an output current IL is positive, an output voltage VOUT rises. At this time, most of the output voltage VOUT is greater than a reference voltage VREF, causing an output signal COMP to fall and resulting in a longer time interval between the meetings of the output signal COMP and a ramp signal RAMP.

Figure 2:
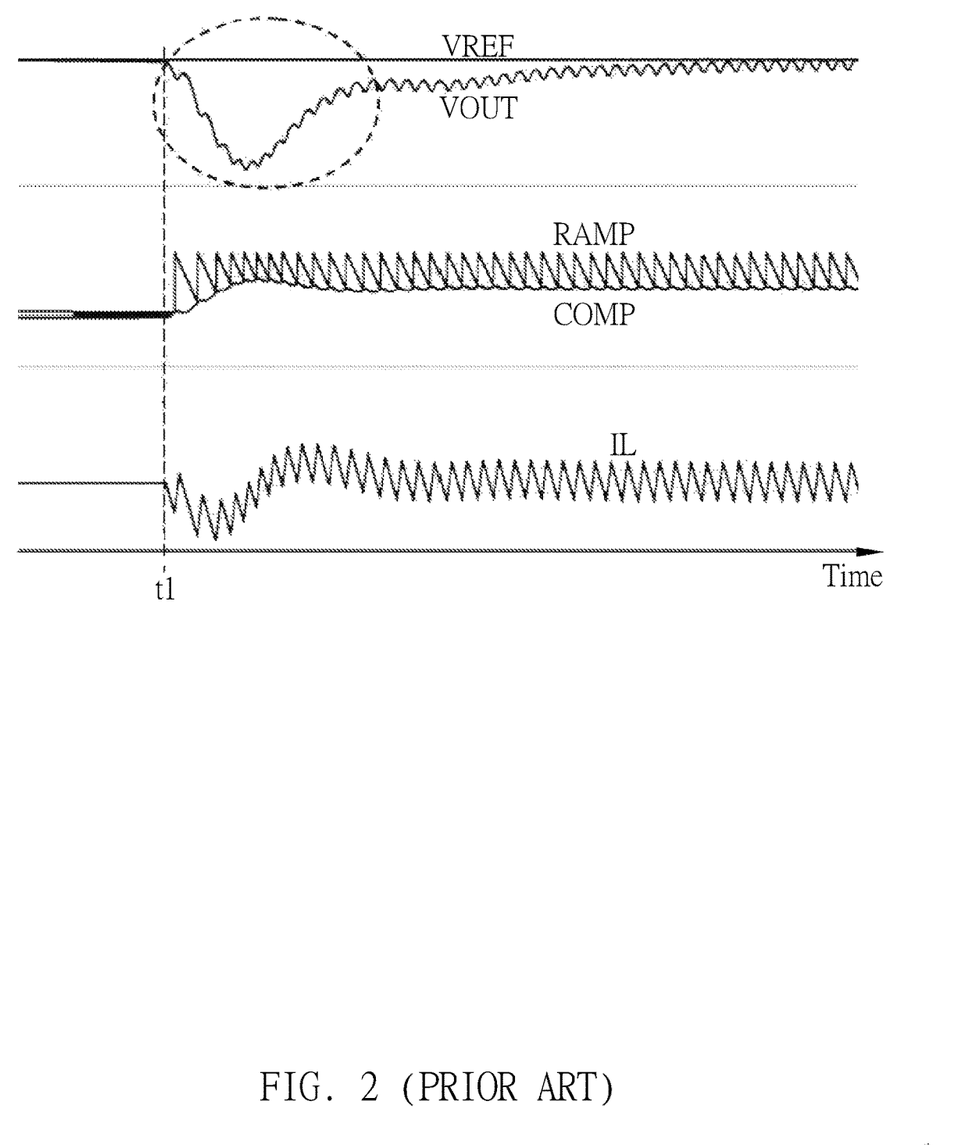
FIG. 2 illustrates timing diagrams of the output voltage, the reference voltage, the output signal, the ramp signal and the inductor current when the conventional power conversion circuit is switched from the DCM to the CCM.

Please refer to FIG. 2. When the power conversion circuit PC is switched from the DCM to the CCM at time t1, the zero-current mechanism is turned off, so that the inductor current IL gets out of the zero-current control state and forms a negative current. The curve of the output signal COMP needs to rise back to a level of a normal operation state. The rise of COMP signal can only be achieved by the fall of the output voltage VOUT.

It can be seen from the above that according to the operation mechanism of the conventional COT power conversion circuit PC, when it is switched from the DCM to the CCM, since the output signal COMP is still at low-level, the frequency of a PWM signal is slow and the energy supply is insufficient, thus the output voltage VOUT decreases and fails to provide stable output.

In addition, if the output signal COMP is limited to a fixed value during the DCM period, the above-mentioned decreasing of the output voltage VOUT can be avoided, but the conventional COT power conversion circuit PC also loses the PWM function in the DCM and fails to provide power pumping or react to transients in the DCM.

Therefore, the above problems encountered in the prior art are should be solved to provide stable output voltage VOUT in all conditions.

SUMMARY OF THE INVENTION

Therefore, the invention provides a power conversion circuit and a power conversion circuit operating method to solve the above-mentioned problems of the prior arts.

A preferred embodiment of the invention is a power conversion circuit. In this embodiment, the power conversion circuit is used to generate an output voltage. The power conversion circuit includes an error amplifying circuit, a first comparison circuit, a second comparison circuit and a control circuit. The error amplifying circuit has a first operation mode and a second operation mode and provides an output signal. The first comparison circuit is coupled to the error amplifying circuit and receives the output signal and a ramp signal to generate a first comparison signal. The second comparison circuit receives the output voltage and a first reference voltage and provides a second comparison signal. The control circuit is coupled to the error amplifying circuit, the first comparison circuit and the second comparison circuit and provides a control signal to the error amplifying circuit to control the operation mode of the error amplifying circuit according to the first comparison signal, the second comparison signal and an enabling signal. In the first operation mode of the error amplifying circuit, the output signal is an error amplifying signal. In the second operation mode of the error amplifying circuit, the output signal is a second reference voltage.

In an embodiment, the power conversion circuit further includes a logic circuit. The logic circuit is coupled to the first comparison circuit and the second comparison circuit and receives the first comparison signal and the second comparison signal to generate a pulse width modulation (PWM) signal.

In an embodiment, when the output voltage is higher than the first reference voltage and the output signal in the first operation mode is lower than the ramp signal, the error amplifying circuit is controlled by the control signal and operates in the second operation mode.

In an embodiment, when the enabling signal is in a first state, the power conversion circuit is switched to a discontinuous conduction mode (DCM); when the enabling signal is in a second state, the power conversion circuit is switched to a continuous conduction mode (CCM) and the error amplifying circuit operates in the first operation mode.

In an embodiment, the control circuit includes a determination circuit. The determination circuit receives the output signal and determines whether a voltage value of the output signal is within a default voltage range.

Another preferred embodiment of the invention is a power conversion circuit operating method. In this embodiment, the power conversion circuit generates an output voltage and includes an error amplifying circuit to provide an output signal. The power conversion circuit operating method includes steps of: (a) providing a first comparison signal according to the output signal and a ramp signal; (b) providing a second comparison signal according to the output signal and a first reference voltage; (c) providing a control signal according to the first comparison signal, the second comparison signal and a mode enabling signal to control the error amplifying circuit to operate in a first operation mode or a second operation mode; (d) when the error amplifying circuit operates in the first operation mode, the error amplifying circuit generating the output signal according to the output voltage and a third reference voltage; and (e) when the error amplifying circuit operates in the second operation mode, the output signal being a second reference voltage.

Compared to the prior art, the power conversion circuit and the operation method thereof in the invention generate a first comparison signal TRIG according to the output signal COMP and the ramp signal RAMP and generate a second comparison signal DIFF according to the output voltage VOUT and the first reference voltage VREF1, and then determine whether the output signal COMP should be limited to a fixed value according to the first comparison signal TRIG and the second comparison signal DIFF, so that the decreasing of the output voltage VOUT due to the lower output signal COMP when the power conversion circuit is switched from the DCM to the CCM can be effectively avoided to maintain stable output.

In addition, when the power conversion circuit of the invention operates in the DCM, if the frequency of the PWM signal is to be modulated, the error amplifying circuit 10 only needs to be switched back to the operation mode according to the first comparison signal TRIG, so that the output signal COMP is no longer limited to the fixed value and can immediately react in response to the output voltage VOUT. The control circuit and the logic circuit can also switch the operation mode of the error amplifying circuit 10 according to the discontinuous conduction mode enabling signal DCM_EN, so that the power conversion circuit of the invention can also provide power pumping or react to transients in the DCM.

The advantage and spirit of the invention may be understood by the following detailed descriptions together with the appended drawings.

DETAILED DESCRIPTION OF THE INVENTION

Exemplary embodiments of the invention are referenced in detail now, and examples of the exemplary embodiments are illustrated in the drawings. Further, the same or similar reference numerals of the elements/components in the drawings and the detailed description of the invention are used on behalf of the same or similar parts.

A preferred embodiment of the invention is a power conversion circuit. Please refer to FIG. 3, the power conversion circuit PC includes a pulse width modulation (PWM) signal generation circuit 1, a time signal generator TG, a comparator CP1, an AND gate AND, a first driver DR1, a NOR gate NOR, an output stage OS, an inductor L, a resistor RD, a resistor RC, a capacitor CC, a capacitor C and a load current ILOAD. The output stage OS includes a first switch M1 and a second switch M2 coupled in series between an input voltage VIN and a ground GND.

Figure 3:
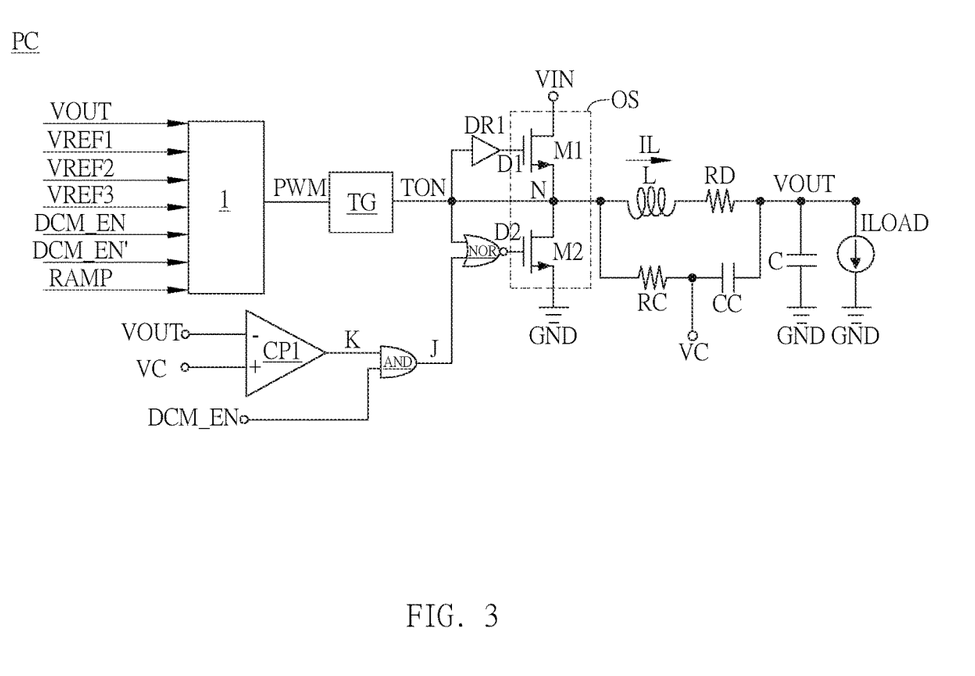
FIG. 3 illustrates a schematic diagram of the power conversion circuit PC in an embodiment of the invention.

The PWM signal generation circuit 1 is coupled to the time signal generator TG. The time signal generator TG is coupled to the first driver DR1 and the NOR gate NOR. The comparator CP1 is coupled to the AND gate AND. The AND gate AND is coupled to the NOR gate NOR. The first driver DR1 is coupled to a gate of the first switch M1. The NOR gate NOR is coupled to a gate of the second switch M2. One terminal of the inductor L is coupled to a node N between the first switch M1 and the second switch M2 and the other terminal of the inductor L is coupled to the resistor RD. The resistor RD is coupled between the inductor L and the output voltage VOUT. The resistor RC is coupled between the node N and the voltage VC. The capacitor CC is coupled between the output voltage VOUT and the voltage VC. The capacitor C is coupled between the output voltage VOUT and the ground GND. The load current ILOAD is coupled between the output voltage VOUT and the ground GND.

The PWM signal generation circuit 1 receives the output voltage VOUT, a first reference voltage VREF1, a second reference voltage VREF2, a third reference voltage VREF3, a ramp signal RAMP, an enable signal DCM_EN and an inversed enable signal DCM_EN' respectively and provides a PWM signal PWM to the time signal generator TG. The time signal generator TG receives the PWM signal PWM and provides an on-time signal TON to the driving circuit DR1 and the NOR gate NOR. The comparator CP1 receives the output voltage VOUT and the voltage VC and provides an output signal K to the AND gate AND. The AND gate AND receives the output signal K and the enable signal DCM_EN and provides an output signal J to the NOR gate NOR.

The enable signal DCM_EN is used to control whether the discontinuous conduction mode (zero current function) is started or not. For example, when the enable signal DCM_EN is in a first state (e.g., high-level), the power conversion circuit is switched to the discontinuous conduction mode (DCM); when the enable signal is in a second state (e.g., low-level), the power conversion circuit is switched to the continuous conduction mode (CCM).

The driving circuit DR1 receives the on-time signal TON and provides a driving signal D1 to a gate of the first switch M1 to control the operation of the first switch M1. The NOR gate NOR receives the on-time signal TON and an output signal J and provides a driving signal D2 to a gate of the second switch M2 to control the operation of the second switch M2. The first switch M1 and the second switch M2 are not turned on at the same time. The node N between the first switch M1 and the second switch M2 outputs the inductor current IL flowing through the inductor L and generates the output voltage VOUT.

Figure 4:
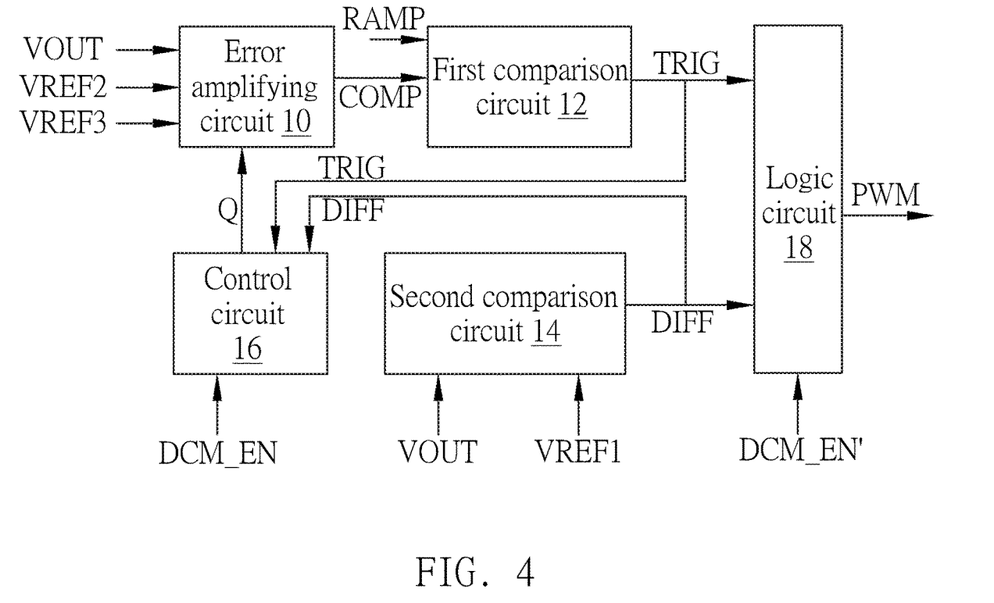
FIG. 4 illustrates a schematic diagram of the PWM signal generation circuit 1 of FIG. 3.

Please refer to FIG. 4, the PWM signal generation circuit 1 includes an error amplifying circuit 10, a first comparison circuit 12, a second comparison circuit 14, a control circuit 16 and a logic circuit 18. The error amplifying circuit 10 is coupled to the first comparison circuit 12 and the control circuit 16. The first comparison circuit 12 is coupled between the error amplifying circuit 10 and the logic circuit 18. The second comparison circuit 14 is coupled to the logic circuit 18. The control circuit 16 is coupled to the error amplifying circuit 10, the first comparison circuit 12 and the second comparison circuit 14. The logic circuit 18 is coupled to the first comparison circuit 12 and the second comparison circuit 14.

The error amplifying circuit 10 has a first operation mode (i.e., a working mode) and a second operation mode (i.e., a buffer mode). The error amplifying circuit 10 receives the output voltage VOUT, the second reference voltage VREF2, the third reference voltage VREF3 and the control signal Q respectively and provides an output signal COMP to the first comparison circuit 12.

The first comparison circuit 12 receives the output signal COMP and the ramp signal RAMP and provides a first comparison signal TRIG to the control circuit 16 and the logic circuit 18. The second comparison circuit 14 receives the output voltage VOUT and the first reference voltage VREF1 and provides a second comparison signal DIFF to the control circuit 16 and the logic circuit 18.

The control circuit 16 receives the first comparison signal TRIG, the second comparison signal DIFF and the enable signal DCM_EN respectively and provides the control signal Q to the error amplifying circuit 10 to control an operation mode of the error amplifying circuit 10, such as switching the operation mode of the error amplifying circuit 10 to the first operation mode (i.e., the working mode) or the second operation mode (i.e., the buffer mode).

When the operation mode of the error amplifying circuit 10 is the first operation mode (i.e., the working mode), the output signal COMP of the error amplifying circuit 10 is an error amplifying signal. In practical applications, the error amplifying circuit 10 can generate the error amplifying signal according to the output voltage VOUT and the first reference voltage VREF1, but not limited to this.

In the first operation mode, when the error amplifying circuit 10 provides the output signal COMP (i.e., the error amplifying signal) to the first comparison circuit 12, the first comparison circuit 12 will compare the output signal COMP (i.e., the error amplifying signal) with the ramp signal RAMP, and the second comparison circuit 14 will compare the output voltage VOUT with the first reference voltage VREF1.

If a comparison result of the second comparison circuit 14 is that the output voltage VOUT is greater than the first reference voltage VREF1, and a comparison result of the first comparison circuit 12 is that the output signal COMP (i.e., the error amplifying signal) is higher than the ramp signal RAMP, then the control circuit 16 will provide the control signal Q to switch the operation mode of the error amplifying circuit 10 to the second operation mode (i.e., the buffer mode).

When the error amplifying circuit 10 operates in the second operational mode (e.g., the buffer mode), the output signal COMP of the error amplifying circuit 10 is the second reference voltage VREF2. In practical applications, the error amplifying circuit 10 can fix the output signal COMP to the second reference voltage VREF2, and the second reference voltage VREF2 is a fixed voltage value, for example, 1.8 volts, but not limited to this.

The logic circuit 18 receives the first comparison signal TRIG, the second comparison signal DIFF and the inversed enable signal DCM_EN' respectively and provides the PWM signal PWM.

Figure 5:
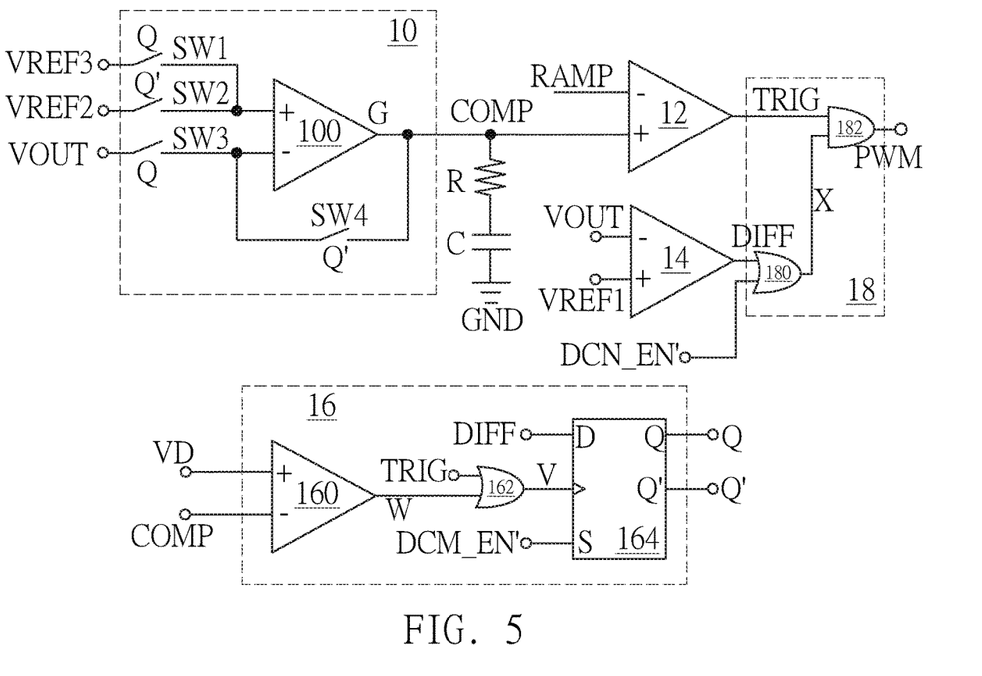
FIG. 5 illustrates an embodiment of the PWM signal generation circuit 1.

Please refer to FIG. 5. FIG. 5 illustrates an embodiment of the PWM signal generation circuit 1. As shown in FIG. 5, the PWM signal generation circuit 1 includes an error amplifying circuit 10, a first comparison circuit 12, a second comparison circuit 14, a control circuit 16, a logic circuit 18, a resistor R and a capacitor C.

The error amplifying circuit 10 includes switches SW1~SW4 and an error amplifier 100. The switches SW1 and SW2 are both coupled to an input terminal + of the error amplifier 100. The switch SW3 is coupled to an input terminal − of the error amplifier 100. The switch SW4 is coupled between the input terminal − and an output terminal G of the error amplifier 100. The switches SW1 and SW3 are both controlled by the control signal Q and the switches SW2 and SW4 are both controlled by the inversed control signal Q'. That is to say, when the switches SW1 and SW3 are conducted by the control signal Q, the switches SW2 and SW4 are not conducted by the inversed control signal Q', and vice versa.

When the operation mode of the error amplifying circuit 10 is the first operation mode (i.e., the working mode), the switches SW1 and SW3 are conducted by the control signal Q and the switches SW2 and SW4 are not conducted by the inversed control signal Q'. The error amplifying circuit 10 can receive the output voltage VOUT and the third reference voltage VREF3 respectively and generate the output signal COMP (i.e., the error amplifying signal) according to the output voltage VOUT and the third reference voltage VREF3.

When the operation mode of the error amplifying circuit 10 is the second operation mode (i.e., the buffer mode), the switches SW2 and SW4 are conducted by the control signal Q and the switches SW1 and SW3 are not conducted by the inversed control signal Q', since the input terminal + of the error amplifying circuit 10 receives the second reference voltage VREF2 (that is, a fixed voltage value, for example, 1.8 volts) and the input terminal − and the output terminal G of the error amplifier 100 are conducted to each other, so that the error amplifying circuit 10 can provide a function of a buffer and output the output signal COMP is fixed to the second reference voltage VREF2.

The control circuit 16 can also include a determination circuit 160, an OR gate 162 and a flip-flop 164. An output terminal of the determination circuit 160 is coupled to the input terminal of the OR gate 162 and the output terminal of the OR gate 162 is coupled to the clock input terminal > of the flip-flop 164.

The determination circuit 160 receives the output signal COMP and a default voltage value VD (for example, 1 volt) and determines whether the voltage value of the output signal COMP is in a default voltage range (for example, greater than 1 volt) to provide an output signal W to the OR gate 162. If the determination result of the determination circuit 160 is YES, the output signal W provided by the determination circuit 160 has high-level; if the determination result of the determination circuit 160 is NO, the output signal W provided by the determination circuit 160 has low-level.

The OR gate 162 receives the first comparison signal TRIG and the output signal W respectively and provides an output signal V to the flip-flop 164. If at least one of the first comparison signal TRIG and the output signal W has high-level, the output signal V provided by the OR gate 162 has high-level; if the first comparison signal TRIG and the output signal W both have low-level, the output signal V provided by the OR gate 162 has low-level.

The three input terminals D, > and S of the flip-flop 164 receive the second comparison signal DIFF provided by the second comparison circuit 14, the output signal V provided by the OR gate 162 and the inversed enable signal DCM_EN' respectively and output the control signal Q and the inversed control signal Q' to the error amplifying circuit 10 respectively.

The logic circuit 18 includes the OR gate 180 and the AND gate 182. The input terminal of the OR gate 180 is coupled to the output terminal of the second comparison circuit 14. The two input terminals of the AND gate 182 are coupled to the output terminal of the OR gate 180 and the output terminal of the first comparison circuit 12 respectively.

The OR gate 180 receives the second comparison signal DIFF provided by the second comparison circuit 14 and the inversed enable signal DCM_EN' respectively and provides an output signal X to the AND gate 182. If at least one of the second comparison signal DIFF and the inversed enable signal DCM_EN' has high-level, the output signal X provided by the OR gate 180 has high-level; if the second comparison signal DIFF and the inversed enable signal DCM_EN' both have low-level, the output signal X provided by the OR gate 162 has low-level.

The AND gate 182 receives the first comparison signal TRIG provided by the first comparison circuit 12 and the output signal X provided by the OR gate 162 respectively and provides the PWM signal PWM according to the first comparison signal TRIG and the output signal X. In practical applications, the AND gate 182 outputs the PWM signal PWM to the time signal generator TG if both the first comparison signal TRIG and the output signal X of the OR gate 162 have high-level.

Figure 6:
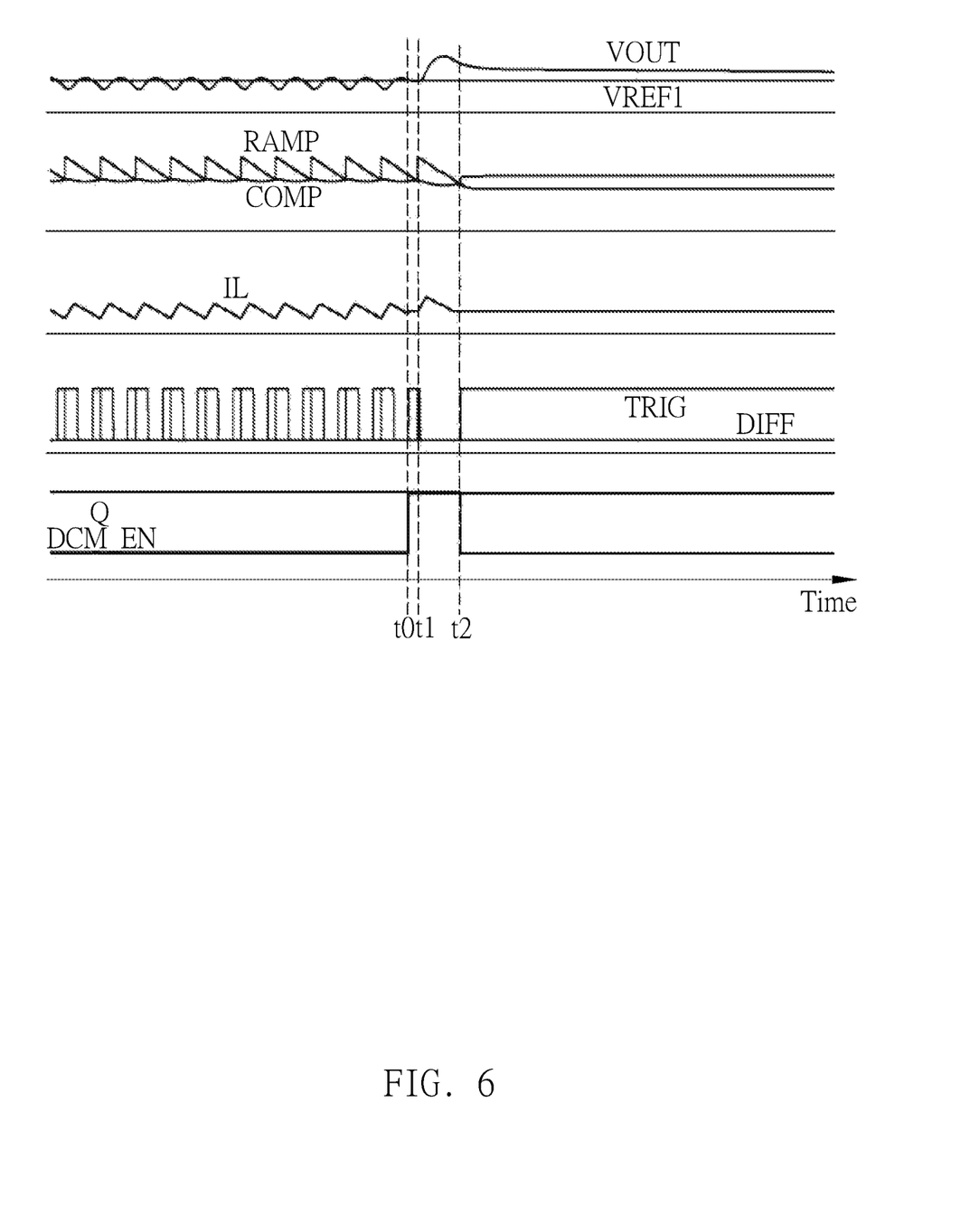
FIG. 6 illustrates timing diagrams of the output voltage, the first reference voltage, the output signal, the ramp signal, the inductor current, the first comparison signal, the second comparison signal, the control signal and the DCM enabling signal when the power conversion circuit of the invention is switched from the CCM to the DCM.

Please refer to FIG. 6. At the time t0, the enable signal DCM_EN is changed from low-level to high-level, indicating that the power conversion circuit 1 is switched from the continuous conduction mode (CCM) to the discontinuous conduction mode (DCM), so that the zero-current mode starts. Since the output voltage VOUT is lower than the first reference voltage VREF1, the second comparison signal DIFF provided by the second comparison circuit 14 has high-level. Although the output signal COMP provided by the error amplifying circuit 10 starts to rise, since it has not yet intersected the ramp signal RAMP, the first comparison signal TRIG provided by the first comparison circuit 12 has low-level. The control signal Q provided by the control circuit 16 according to the enable signal DCM_EN, the first comparison signal TRIG and the second comparison signal DIFF is maintained at high-level, so that the error amplifying circuit 10 maintains operation in the first operation mode (i.e., the working mode).

At the time t1, since the output voltage Vout is still lower than the first reference voltage VREF1, the second comparison signal DIFF provided by the second comparison circuit 14 still has high-level. The output signal COMP provided by the error amplifying circuit 10 intersects with the ramp signal RAMP at this time (that is, the ramp signal RAMP will start to be lower than the output signal COMP), so that the first comparison signal TRIG provided by the first comparison circuit 12 is changed from low-level to high-level. The control signal Q provided by the control circuit 16 according to the enable signal DCM_EN, the first comparison signal TRIG and the second comparison signal DIFF is still maintained at high-level, so that the error amplifying circuit 10 maintains operation in the first operation mode (i.e., the working mode). At the same time, since the first comparison signal TRIG provided by the first comparison circuit 12 and the second comparison signal DIFF provided by the second comparison circuit 14 both have high-level, the logic circuit 18 will generate the PWM signal PWM for the time signal generator TG to generate the on-time signal TON.

At the time t2, the ramp signal RAMP is lower than the output signal COMP, so that the first comparison signal TRIG provided by the first comparison circuit 12 is maintained at high-level. At this time, the output voltage Vout is higher than the first reference voltage VREF1, so the second comparison signal DIFF provided by the second comparison circuit 14 has low-level. The control signal Q provided by the control circuit 16 according to the enable signal DCM_EN, the first comparison signal TRIG and the second comparison signal DIFF is changed from high-level to low-level and the error amplifying circuit 10 is switched to the second operation mode (i.e., the buffer mode). At this time, the output signal COMP of the error amplifying circuit 10 is fixed to the second reference voltage VREF2 (for example, 1.8 volts).

Figure 7:
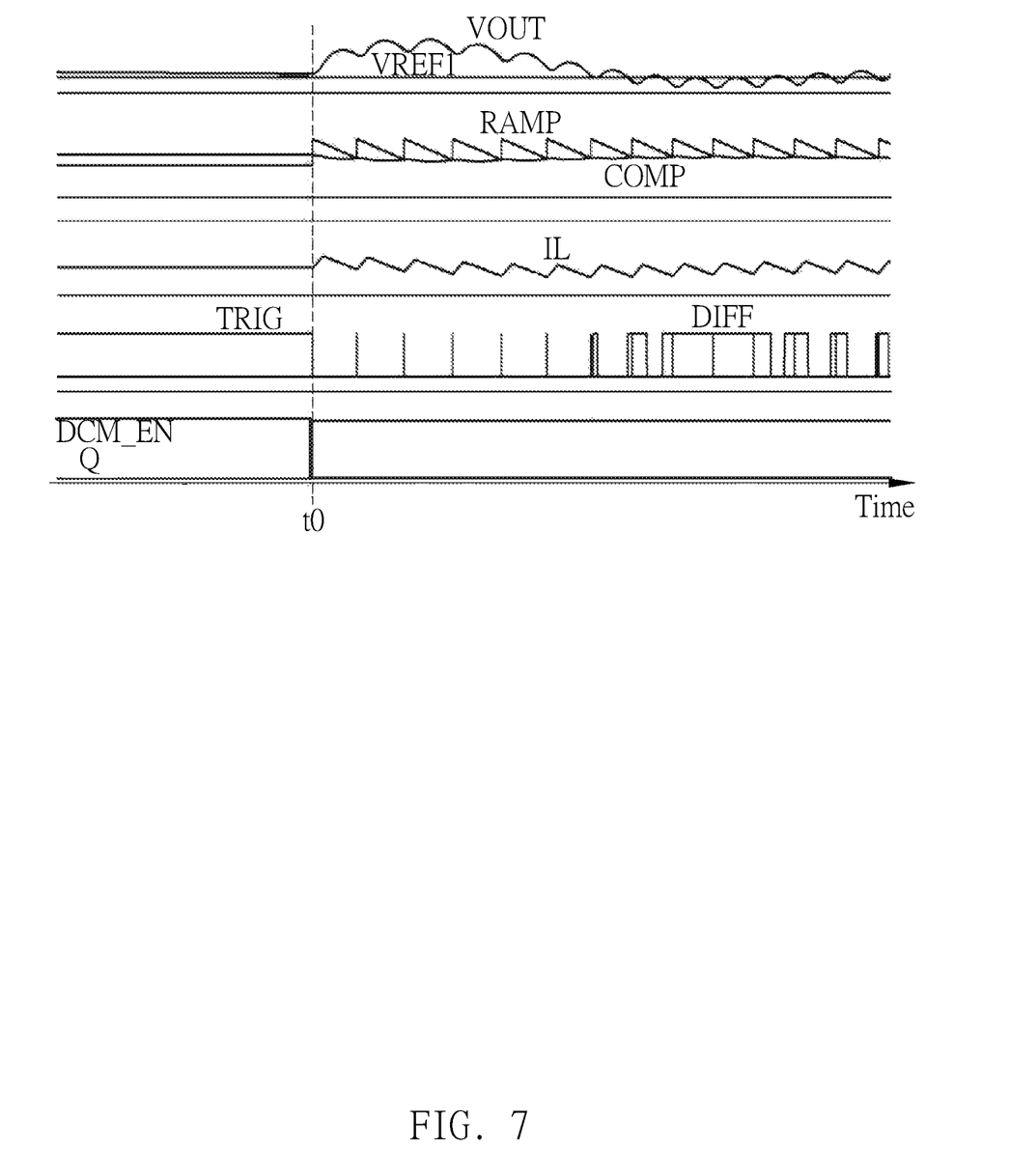
FIG. 7 illustrates timing diagrams of the output voltage, the first reference voltage, the output signal, the ramp signal, the inductor current, the first comparison signal, the second comparison signal, the control signal and the enabling signal when the power conversion circuit of the invention is switched from the DCM to the CCM.

Please refer to FIG. 7. At the time t0, the enable signal DCM_EN is changed from high-level to low-level, indicating that the power conversion circuit 1 is switched from the DCM to the CCM, so that the zero-current mode is turned off. At this time, the inversed enable signal DCM_EN' is changed from low-level to high-level to mask the second comparison signal DIFF, so that the logic circuit 18 will generate the PWM signal PWM only in response to the first comparison signal TRIG. At this time, since the enable signal DCM_EN received by the control circuit 16 has low-level, the control signal Q provided by the control circuit 16 will have high-level to switch the error amplifying circuit 10 to the first operation mode (i.e., the working mode).

It should be noted that since the curve of the output signal COMP does not fall down when the DCM is switched to the CCM, power supply can be normal immediately after returning to the CCM, there will be no unstable output problem caused by the decrease of the output voltage VOUT due to insufficient energy.

Figure 8:
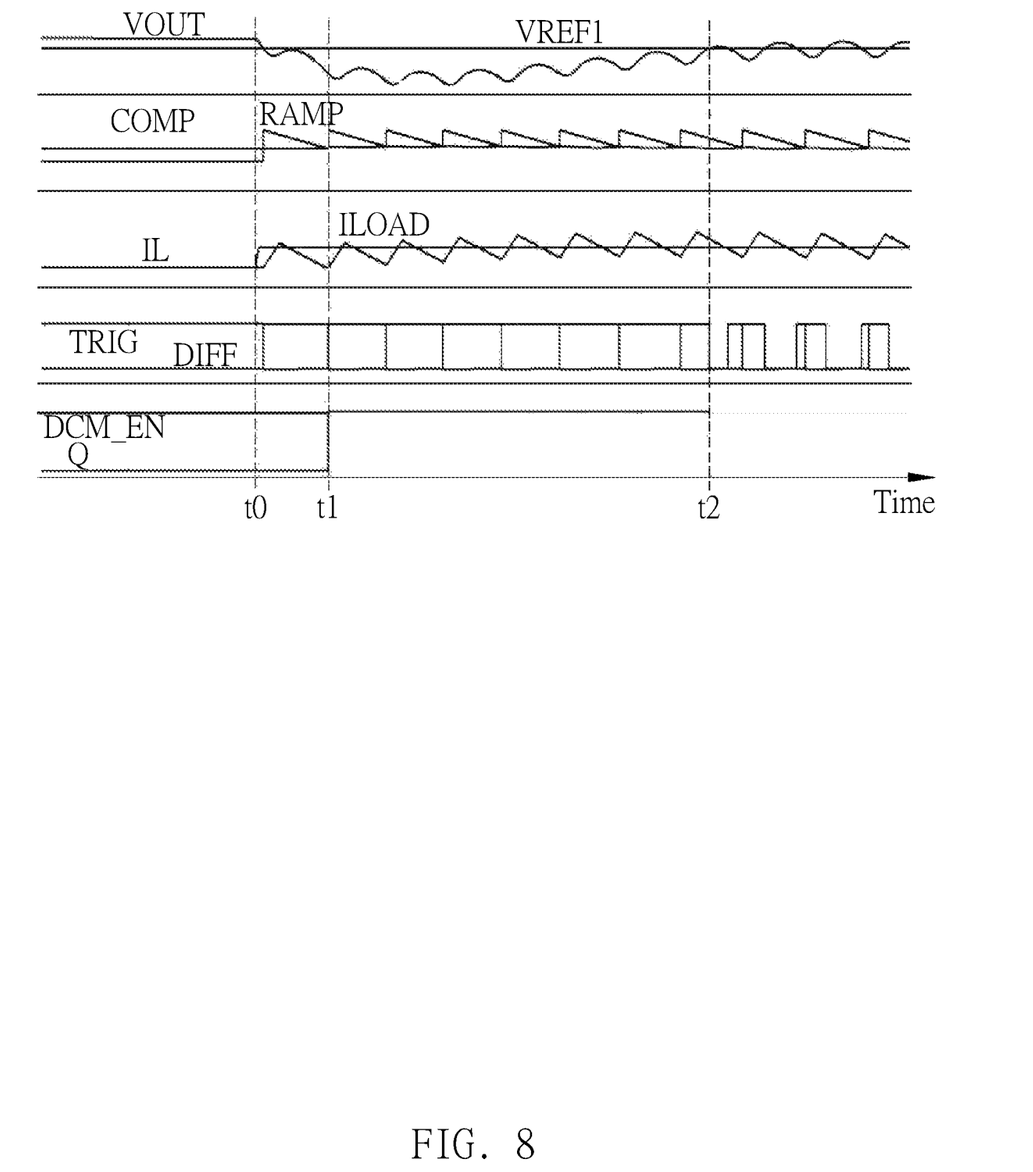
FIG. 8 illustrates timing diagrams of the output voltage, the first reference voltage, the output signal, the ramp signal, the inductor current, the first comparison signal, the second comparison signal, the control signal and the enabling signal when the power conversion circuit of the invention encounters a pumping in the DCM.

Please refer to FIG. 8. When the power conversion circuit 1 is operated in the DCM, if the pumping condition is encountered at the time t0, the load current ILOAD will start to increase and the output voltage VOUT will decrease. At the time t1, the ramp signal RAMP is deceased to intersect with the output signal COMP, the first comparison signal TRIG is changed from low-level to high-level, and the output voltage VOUT is lower than the first reference voltage VREF1, so that the second comparison signal DIFF has high-level. The control signal Q provided by the control circuit 16 according to the enable signal DCM_EN, the first comparison signal TRIG and the second comparison signal DIFF will be changed from low-level to high-level, so that the error amplifying circuit 10 will be operated in the first operation mode (i.e., the working mode).

Another preferred embodiment of the invention is a power conversion circuit operating method. In this embodiment, the power conversion circuit generates an output voltage and includes an error amplifying circuit to provide an output signal according to the output voltage.

Figure 9:
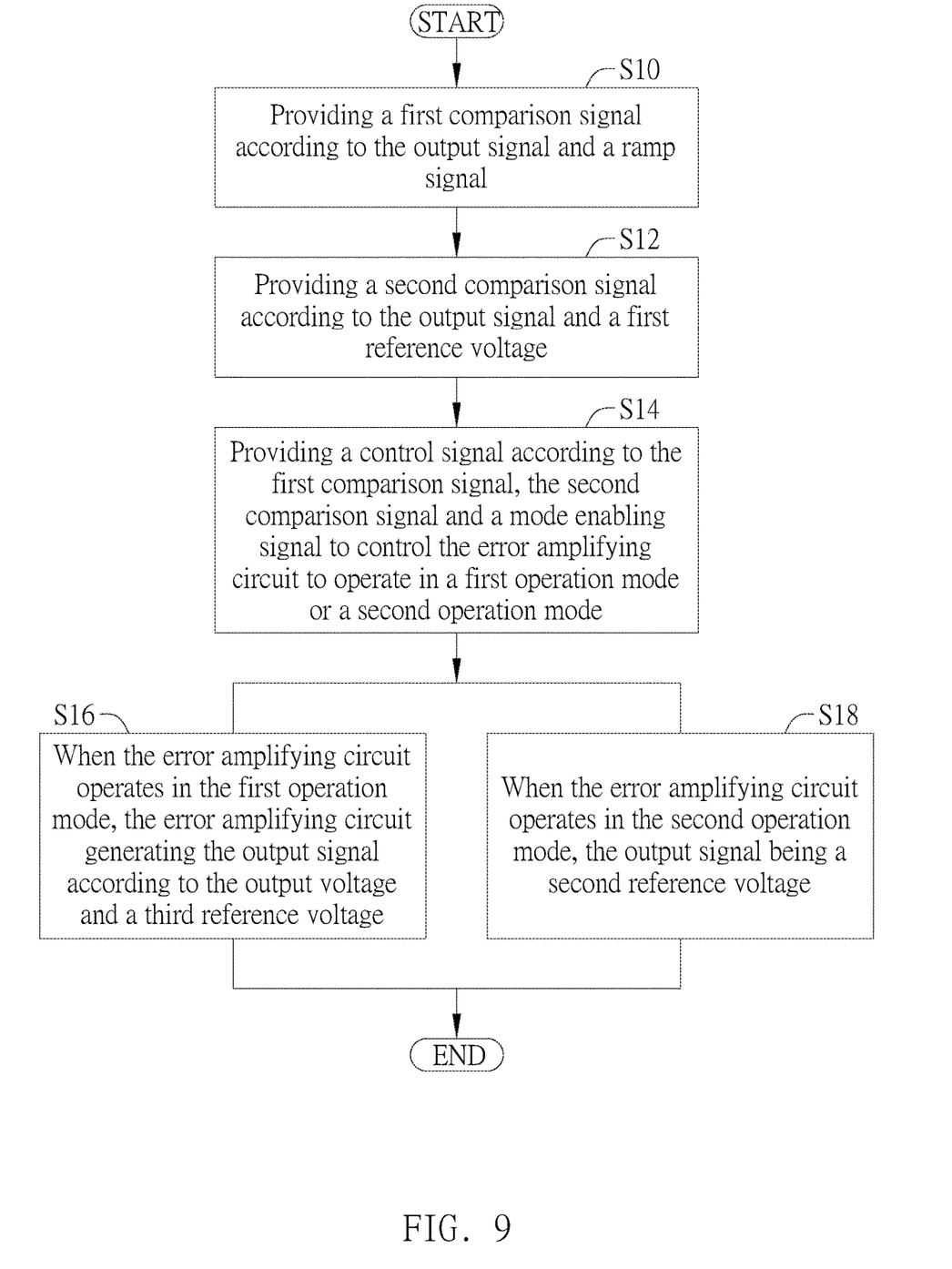
FIG. 9 illustrates a flow chart of the power conversion circuit operating method in another embodiment of the invention.

Please refer to FIG. 9. FIG. 9 illustrates a flow chart of the power conversion circuit operating method in this embodiment. As shown in FIG. 9, the power conversion circuit operating method includes steps of:

Step S10: providing a first comparison signal according to the output signal and a ramp signal;

Step S12: providing a second comparison signal according to the output signal and a first reference voltage;

Step S14: providing a control signal according to the first comparison signal, the second comparison signal and a mode enabling signal to control the error amplifying circuit to operate in a first operation mode or a second operation mode;

Step S16: when the error amplifying circuit operates in the first operation mode, the error amplifying circuit generating the output signal according to the output voltage and a third reference voltage; and Step S18: when the error amplifying circuit operates in the second operation mode, the output signal being a second reference voltage.

When the output voltage is higher than the first reference voltage and the output signal in the first operation mode is lower than the ramp signal, the error amplifying circuit operates in the second operation mode. In the step S18, the error amplifying circuit fixes the output signal at the second reference voltage and the second reference voltage is a fixed value. The step S14 can further include determining whether a voltage value of the output signal is within a default voltage range.

Compared to the prior art, the power conversion circuit and the operation method thereof in the invention generate a first comparison signal TRIG according to the output signal COMP and the ramp signal RAMP and generate a second comparison signal DIFF according to the output voltage VOUT and the first reference voltage VREF1, and then determine whether the output signal COMP should be limited to a fixed value according to the first comparison signal TRIG and the second comparison signal DIFF, so that the decreasing of the output voltage VOUT due to the lower output signal COMP when the power conversion circuit is switched from the DCM to the CCM can be effectively avoided to maintain stable output.

In addition, when the power conversion circuit of the invention operates in the DCM, if the frequency of the PWM signal is to be modulated, the error amplifying circuit 10 only needs to be switched back to the operation mode according to the first comparison signal TRIG, so that the output signal COMP is no longer limited to the fixed value and can immediately react in response to the output voltage VOUT. The control circuit and the logic circuit can also switch the operation mode of the error amplifying circuit 10 according to the discontinuous conduction mode enabling signal DCM_EN, so that the power conversion circuit of the invention can also provide power pumping or react to transients in the DCM.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A power conversion circuit used for generating an output voltage, comprising:
   an error amplifying circuit, having a first operation mode and a second operation mode and configured to provide an output signal;
   a first comparison circuit, coupled to the error amplifying circuit and configured to receive the output signal and a ramp signal to generate a first comparison signal;
   a second comparison circuit, configured to receive the output voltage and a first reference voltage and provide a second comparison signal; and
   a control circuit, coupled to the error amplifying circuit, the first comparison circuit and the second comparison circuit and configured to provide a control signal to the error amplifying circuit according to the first comparison signal, the second comparison signal and an enabling signal to control an operation mode of the error amplifying circuit,
   wherein when the error amplifying circuit operates in the first operation mode, the output signal is an error amplifying signal; when the error amplifying circuit operates in the second operation mode, the output signal is a second reference voltage.

2. The power conversion circuit of claim 1, further comprising:
   a logic circuit, coupled to the first comparison circuit and the second comparison circuit and configured to receive the first comparison signal and the second comparison signal to generate a pulse width modulation (PWM) signal.

3. The power conversion circuit of claim 1, wherein when the output voltage is higher than the first reference voltage and the output signal in the first operation mode is lower than the ramp signal, the error amplifying circuit is controlled by the control signal and operates in the second operation mode.

4. The power conversion circuit of claim 1, wherein when the enabling signal is in a first state, the power conversion circuit is switched to a discontinuous conduction mode (DCM); when the enabling signal is in a second state, the power conversion circuit is switched to a continuous conduction mode (CCM) and the error amplifying circuit operates in the first operation mode.

5. The power conversion circuit of claim 1, wherein the control circuit comprises:
   a determination circuit, configured to receive the output signal and determine whether a voltage value of the output signal is within a default voltage range.

6. A method of operating a power conversion circuit, the power conversion circuit generating an output voltage and comprising an error amplifying circuit to provide an output signal, the method comprising steps of:
   (a) providing a first comparison signal according to the output signal and a ramp signal;
   (b) providing a second comparison signal according to the output signal and a first reference voltage;
   (c) providing a control signal according to the first comparison signal, the second comparison signal and an enabling signal to control the error amplifying circuit to operate in a first operation mode or a second operation mode;
   (d) when the error amplifying circuit operates in the first operation mode, the error amplifying circuit generating the output signal according to the output voltage and a third reference voltage; and
   (e) when the error amplifying circuit operates in the second operation mode, the output signal being a second reference voltage.

7. The method of claim 6, wherein when the output voltage is higher than the first reference voltage and the output signal in the first operation mode is lower than the ramp signal, the error amplifying circuit operates in the second operation mode.

8. The method of claim 6, wherein the step (c) further comprises:

determining whether a voltage value of the output signal is within a default voltage range.

* * * * *